(12) United States Patent
Veerabadran

(10) Patent No.: US 9,334,040 B2
(45) Date of Patent: May 10, 2016

(54) LANDING GEAR DOOR DAMPING MECHANISM FOR AIRCRAFT

(71) Applicant: AIRBUS OPERATIONS (SAS), Toulouse (FR)

(72) Inventor: Karounen Veerabadran, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 525 days.

(21) Appl. No.: 13/800,220

(22) Filed: Mar. 13, 2013

(65) Prior Publication Data

US 2013/0249152 A1    Sep. 26, 2013

(30) Foreign Application Priority Data

Mar. 27, 2012   (EP) .................................... 12161567

(51) Int. Cl.
- *B64C 1/14* (2006.01)
- *B64C 25/16* (2006.01)
- *E05B 77/00* (2014.01)

(52) U.S. Cl.
CPC ............... *B64C 1/1407* (2013.01); *B64C 25/16* (2013.01); *E05B 77/00* (2013.01)

(58) Field of Classification Search
CPC ........ B64C 1/1407; B64C 1/14; B64C 25/16; B64C 25/20; E05B 77/00
USPC ............... 188/266; 267/140.11, 73, 195, 217, 267/221; 16/82–86 C; 244/129.4, 129.5, 244/102 R, 137.1
See application file for complete search history.

(56) References Cited

U.S. PATENT DOCUMENTS

| 4,176,812 | A |   | 12/1979 | Baker |
|---|---|---|---|---|
| 5,305,969 | A | * | 4/1994 | Odell .................... B64C 1/1407 244/129.5 |
| 5,679,625 | A | * | 10/1997 | Ito ......................... C23C 14/087 204/192.24 |
| 5,803,404 | A |   | 9/1998 | Petrou |
| 5,979,825 | A |   | 11/1999 | Cox |

(Continued)

FOREIGN PATENT DOCUMENTS

| DE | 10 2010 006816 | 8/2011 |
|---|---|---|
| EP | 2644499 | 10/2013 |
| FR | 2957052 | 9/2011 |

OTHER PUBLICATIONS

European Search Report for Application No. EP 12 16 1567 dated Jan. 8, 2013.

(Continued)

*Primary Examiner* — Thomas Irvin
(74) *Attorney, Agent, or Firm* — Jenkins, Wilson, Taylor & Hunt, P.A.

(57) ABSTRACT

The invention provides a damping mechanism which comprises a damper; and a coupling mechanism. The coupling mechanism comprises a coupling member which is pivotally attached to the damper and has a pivot bearing for pivotally connecting the coupling member to a structure when in use; and a fitting which can be engaged with the coupling member to couple the fitting with the damper and disengaged with the coupling member to decouple the fitting from the damper. More, the coupling member has a pair of parallel planar faces which taper outwardly from the pivot bearing to a convex curved edge, an upper edge and a lower edge; and a first and a second recess formed in the convex curved edge, a rib between the first and the second recesses and, a third recess formed in the lower edge.

3 Claims, 11 Drawing Sheets

(56) References Cited

U.S. PATENT DOCUMENTS

| | | |
|---|---|---|
| 7,178,759 B2 | 2/2007 | Rouyre |
| 7,357,354 B2 | 4/2008 | Mortland |
| 9,056,665 B2 * | 6/2015 | Veerabadran ......... B64C 1/1407 |
| 2005/0194496 A1 | 9/2005 | White |
| 2008/0128555 A1 | 6/2008 | Dotte |
| 2010/0109497 A1 | 5/2010 | Blersch |
| 2010/0127124 A1 | 5/2010 | Yada et al. |
| 2010/0140394 A1 | 6/2010 | Brookfield |
| 2010/0140395 A1 | 6/2010 | Amberg |
| 2011/0127376 A1 | 6/2011 | Gleyse |
| 2013/0256458 A1 * | 10/2013 | Kress .................... B64C 1/1423 244/129.5 |
| 2013/0264424 A1 | 10/2013 | Veerabadran |

OTHER PUBLICATIONS

European Search Report for Application No. EP 13 16 3772 dated Jul. 19, 2013.

Non-Final Office Action for U.S. Appl. No. 13/801,684 dated Oct. 16, 2014.

Interview Summary for U.S. Appl. No. 13/801,684 dated Feb. 9, 2015.

Notice of Allowance for U.S. Appl. No. 13/801,684 dated Feb. 11, 2015.

* cited by examiner

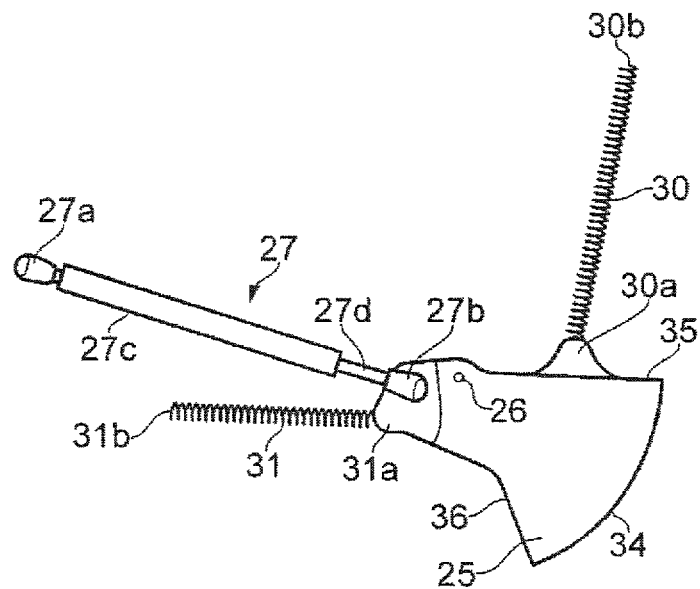
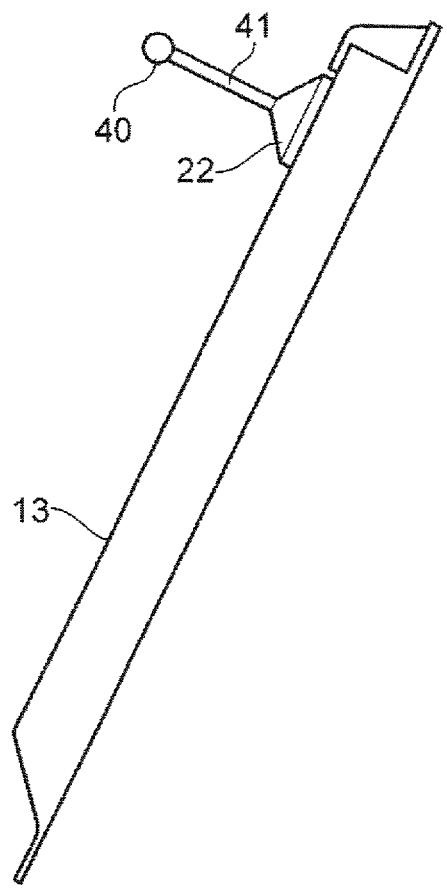
FIG. 9

LANDING GEAR DOOR DAMPING MECHANISM FOR AIRCRAFT

CROSS-REFERENCE TO RELATED APPLICATION

This application claims priority to European Patent Application No. 12 161 567.8 filed on Mar. 27, 2012, the entire content of which is incorporated by reference herein.

FIELD OF THE INVENTION

The present invention relates to a damping mechanism for an aircraft exterior door which is pivotally attached to an airframe, Preferably, although not exclusively, the aircraft exterior door is a landing gear door.

BACKGROUND OF THE INVENTION

A known landing gear door installation is described in US 2011/0127376 A1. The landing gear compartment is closed by several doors: front doors which open during the descent of the gear, in particular to allow the leg thereof to pass, and close after the exit of the gear so as to preserve the aerodynamic shape of the fuselage of the aircraft; and rear doors which open during the descent of the gear and remain open as long as the gear is down.

As described in FR 2957052 A1, such an arrangement can cause undesirable vibrations in the rear doors. FR 2957052 A1 provides a solution to this problem in the form of fins upstream of the doors which generate vortices in the airflow.

Document U.S. Pat. No. 5,979,825 describes an aircraft arresting gear which can be deployed from a stowed position to a deployed position and comprising a planar frame and a damping mechanism. The damping comprises a deploying damper-actuator, coupled between the planar frame and the structure of the aircraft. Such a damping mechanism cannot control the landing gear doors opening and doesn't prevent from undesirable vibrations that appear when the landing gear doors starts opening.

SUMMARY OF THE INVENTION

In a first aspect, the invention provides a damping mechanism that comprises a damper and a coupling mechanism.

The coupling mechanism comprises a coupling member which is pivotally attached to the damper and has a pivot bearing for pivotally connecting the coupling member to a structure when in use. The coupling mechanism has also a fitting which can be engaged with the coupling member to couple the fitting with the damper and disengaged with the coupling member to decouple the fitting from the damper.

The coupling members has a pair of parallel planar faces which taper outwardly from the pivot bearing to the convex curved edge, an upper edge and a lower edge and a first and a second recess formed in the convex curved edge, a rib between the first and the second recesses, a third recess formed in the lower edge.

In a second aspect of the invention, the damping mechanism further comprising a return mechanism arranged to rotate the coupling member about the pivot after the fitting and coupling member have been disengaged.

In a third aspect of the invention, the fitting of the damping mechanism comprises an elongate member with a curved tip which can interact with the coupling member via a rolling interaction.

BRIEF DESCRIPTION OF THE DRAWINGS

Embodiments of the invention will now be described with reference to the accompanying drawings, in which:

FIGS. 7-11 are front views showing the door at various stages during opening and closing.

DETAILED DESCRIPTION OF EMBODIMENT(S)

Figure 1:
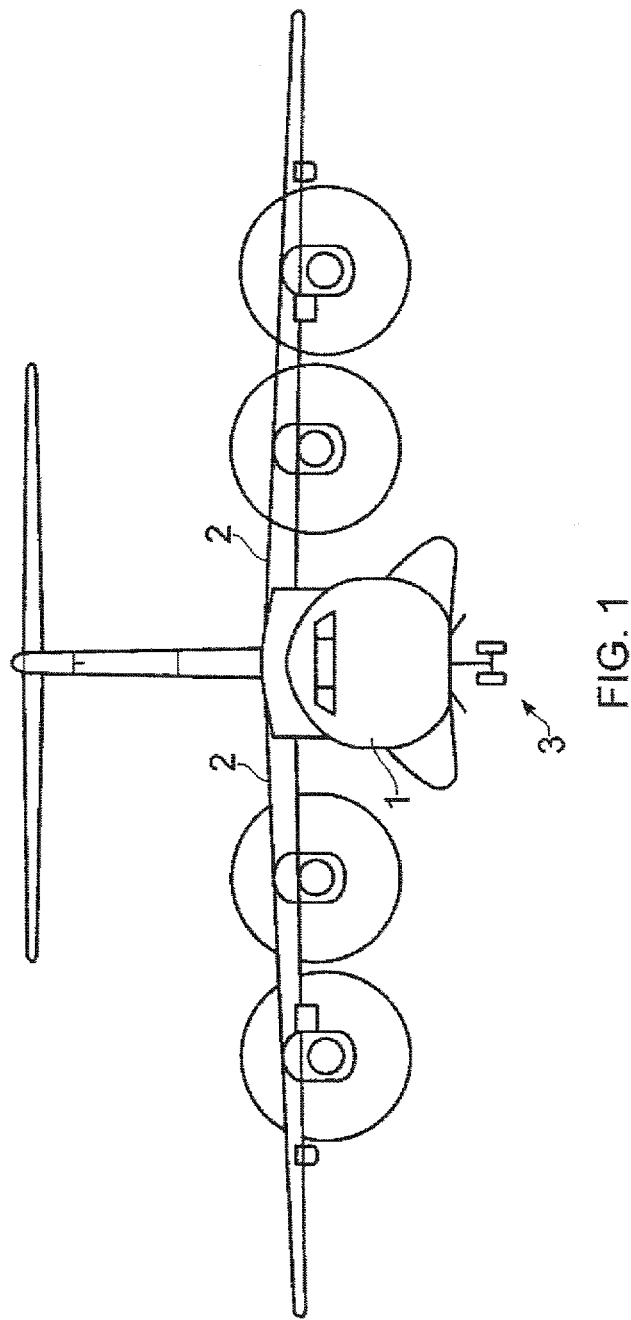
FIG. 1 is a front view of an aircraft with its nose landing gear lowered.

An aircraft shown in FIG. 1 has an airframe comprising a fuselage 1 and a pair of wings 2. The fuselage 1 has a nose landing gear 3 shown in FIG. 1 in its lowered position.

Figure 2:
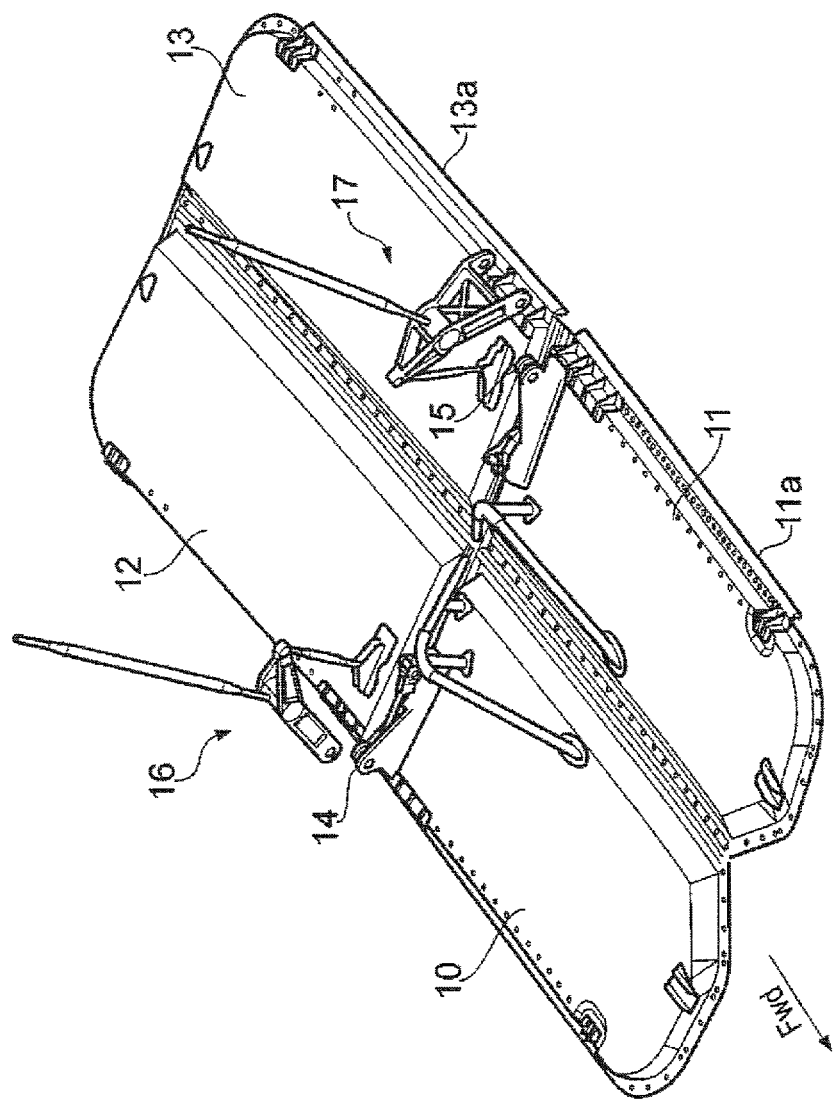
FIG. 2 is a perspective view of the nose landing gear bay doors.

During cruise of the aircraft the landing gear is housed in a landing gear bay which is closed by four landing gear bay doors 10-13 shown in FIG. 2, each of which is pivotally attached to the fuselage by a hinge 11a, 13a at its outer edge so it can be rotated down from its closed position shown in FIG. 2 to its open position.

Prior to lowering the landing gear 3 the pair of forward doors 10,11 are opened to about 120° by hydraulic actuators (not shown) attached to fittings 14,15. The landing gear is then lowered, and as it does so the motion of the landing gear causes the rear doors 12,13 to open at the same time via a kinematic linkage mechanism 16,17 attached to each rear door. The forward doors 10,11 are then closed. This sequence is then reversed when the landing gear is raised after takeoff. The rear doors 12,13 are opened to a large angle of about 145° to give high ground clearance, enabling the aircraft to land on an unprepared runway without risking damage to the doors.

When the two forward doors 10,11 are open and the rear doors 12,14 are closed or partially closed, there is an aerodynamic transit excitation due to cavity flow within the landing gear bay. This excitation results in pressure oscillations inside the landing gear bay. The excitation frequency bandwidth of this phenomenon is such that there is coupling with the natural frequency of the rear doors 12,13 as they start to open, leading to vibration of the doors 12, 14 but this vibration only exists up to about 30°.

Figure 3:
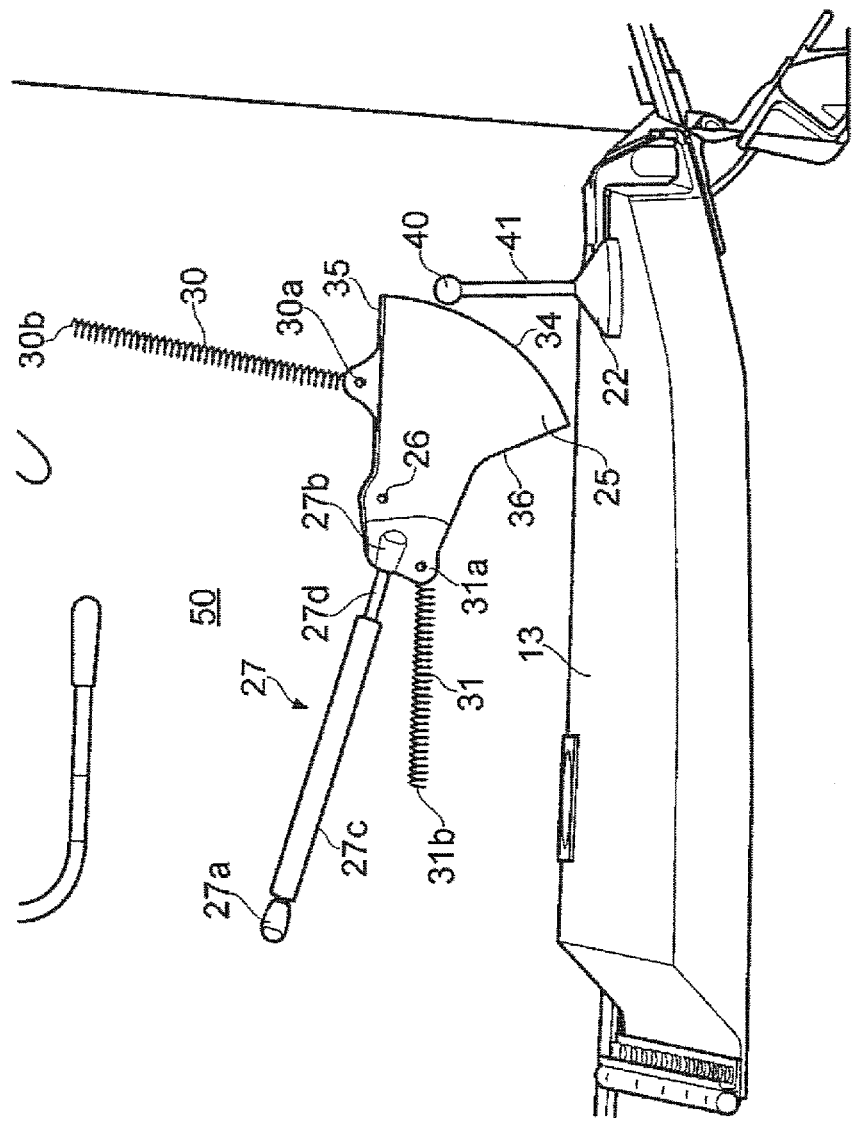
FIG. 3 shows the port rear door in its fully closed position.

To reduce such vibrations a pair of damping mechanisms is arranged to damp the motion of the rear doors as they are opened and closed. FIG. 3 show the damping mechanism for the port rear door, the other damping mechanism being a mirror image.

The door 13 comprises a panel with an outer face on an exterior of the aircraft and an inner face carrying a fitting with a base 22 and elongate shaft 41. The fitting is positioned towards the rear edge of the door and extends perpendicular to the door panel into the landing gear bay 50 as shown in FIG. 3. A roller 25 is pivotally attached to the rear wall of the landing gear bay. The roller 25 has a pivot bearing in the form of a hole 26 which receives a pivot pin (not shown) extending from the rear wall of the landing gear bay. A damper 27 has a cylinder 27c containing hydraulic fluid which is pivotally attached to the rear wall of the landing gear bay at a pivot 27a. A piston 27d is received in the cylinder and has a piston head (not shown) with one or more orifices through which the hydraulic fluid flows as the piston moves in and out of the cylinder, creating a viscous damping force proportional to velocity. The piston 27d is pivotally attached to the roller at a second pivot 27b. A pair of coil springs 30, 31 are provided, each having a first end 30a, 31a attached to the roller and a second end 30b, 31b attached to the rear wall of the landing gear bay. The springs are both in tension and bias the roller towards a central position shown in FIG. 3.

Figure 4:
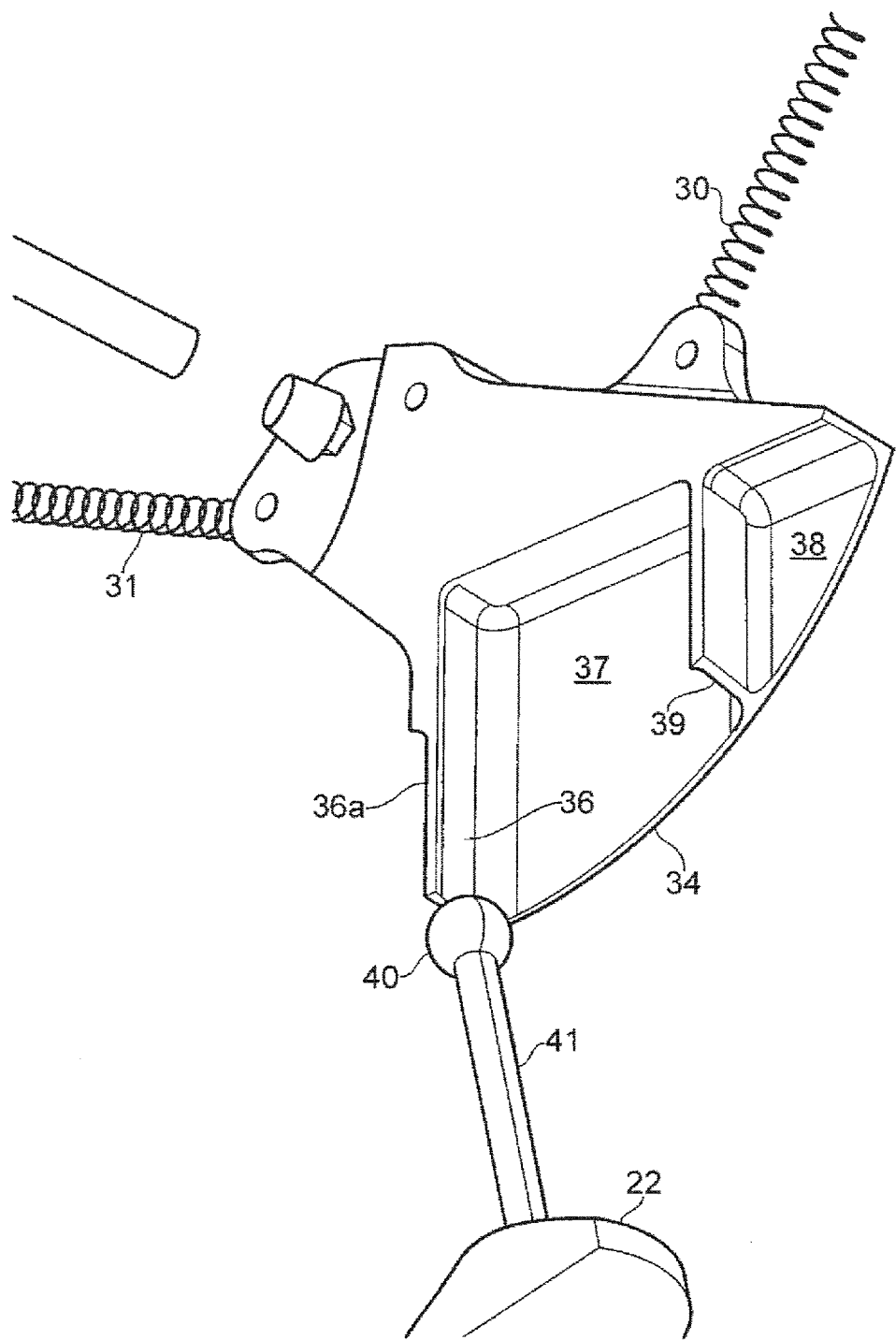
FIG. 4 is a cross-sectional view of the damping mechanism.
Figure 5:
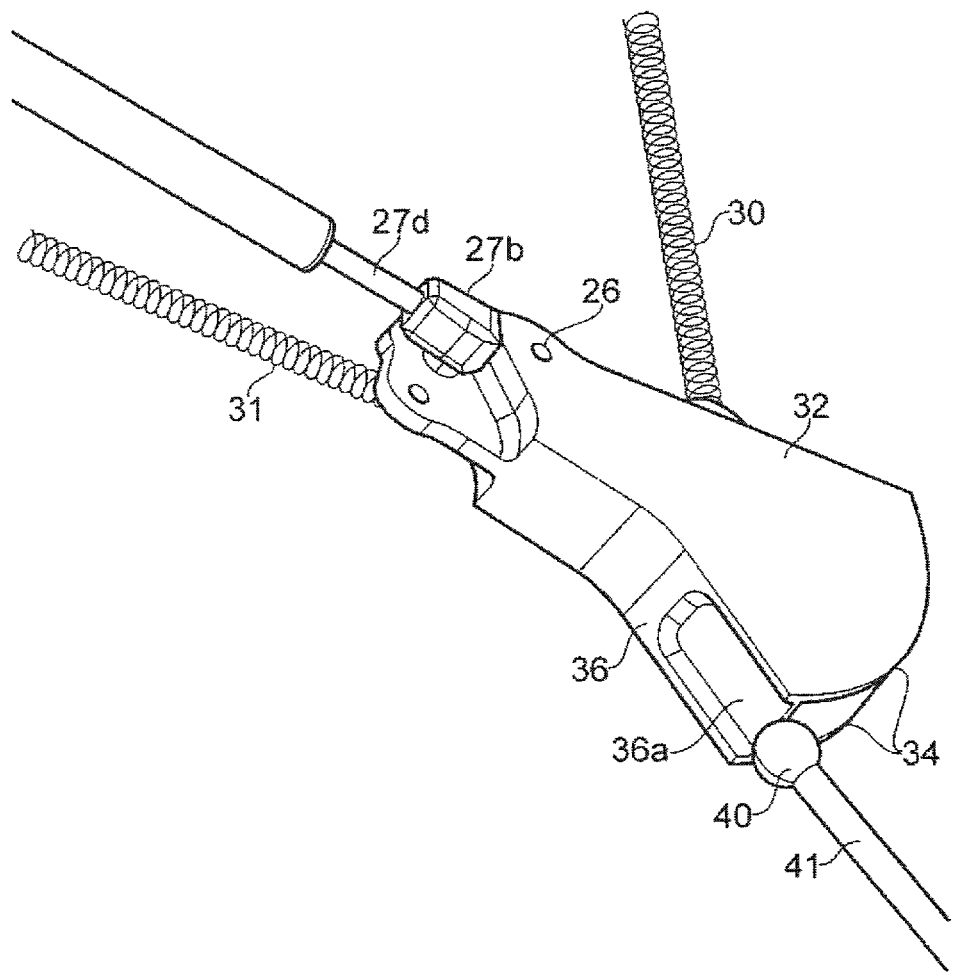
FIG. 5 shows the damping mechanism viewed from a first angle.
Figure 6:
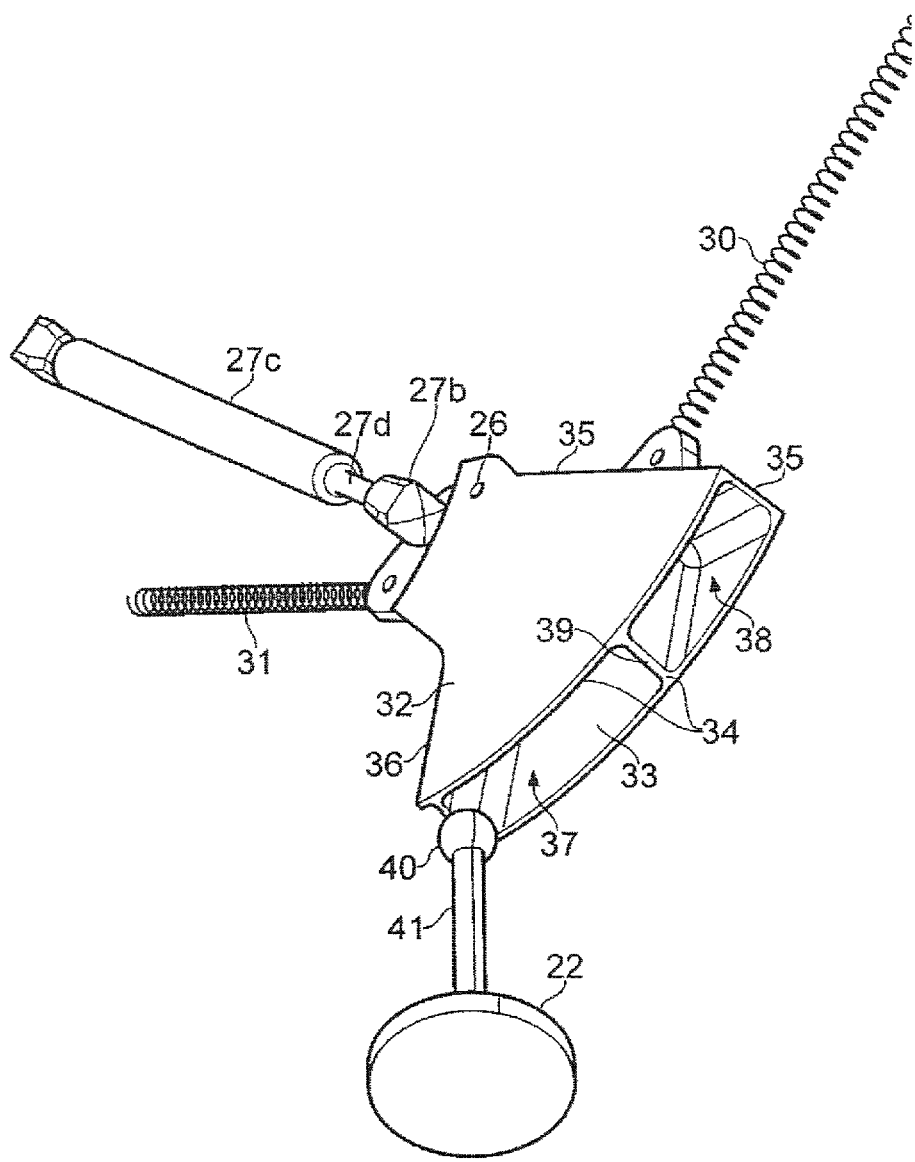
FIG. 6 shows the damping mechanism viewed from a second angle.

As shown in FIGS. 4-6 the roller 25 has a pair of parallel planar fore and aft faces 32, 33 which taper outwardly from the pivot bearing 26 to a convex curved edge 34, an upper edge 35 and a lower edge 36. A pair of recesses 37, 38 is formed in the convex curved edge 34, leaving a rib 39 between the recesses which lie parallel to the lower edge 36 as shown most clearly in the cross-sectional view of FIG. 4. A recess 36a is also formed in the lower edge 36 as shown most clearly in FIG. 5.

The fitting 22 and roller 25 act together as a coupling mechanism which couples the damper 27 with the door over various preselected ranges of its motion and decouples them over others as shown in FIGS. 7 to 11.

Figure 7:
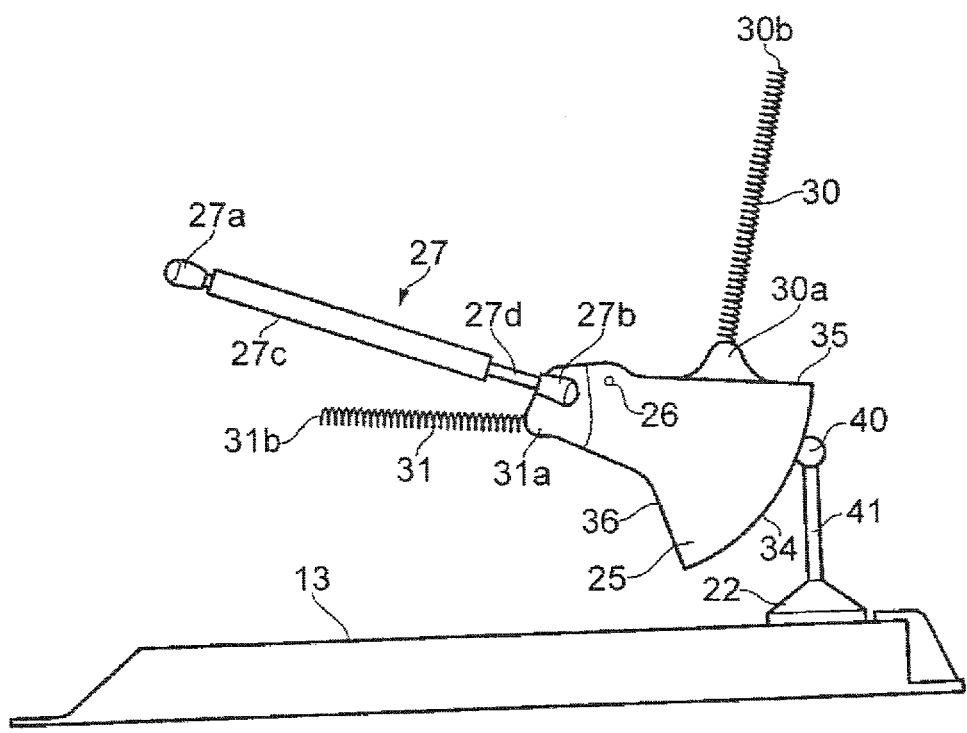
Figure 8:
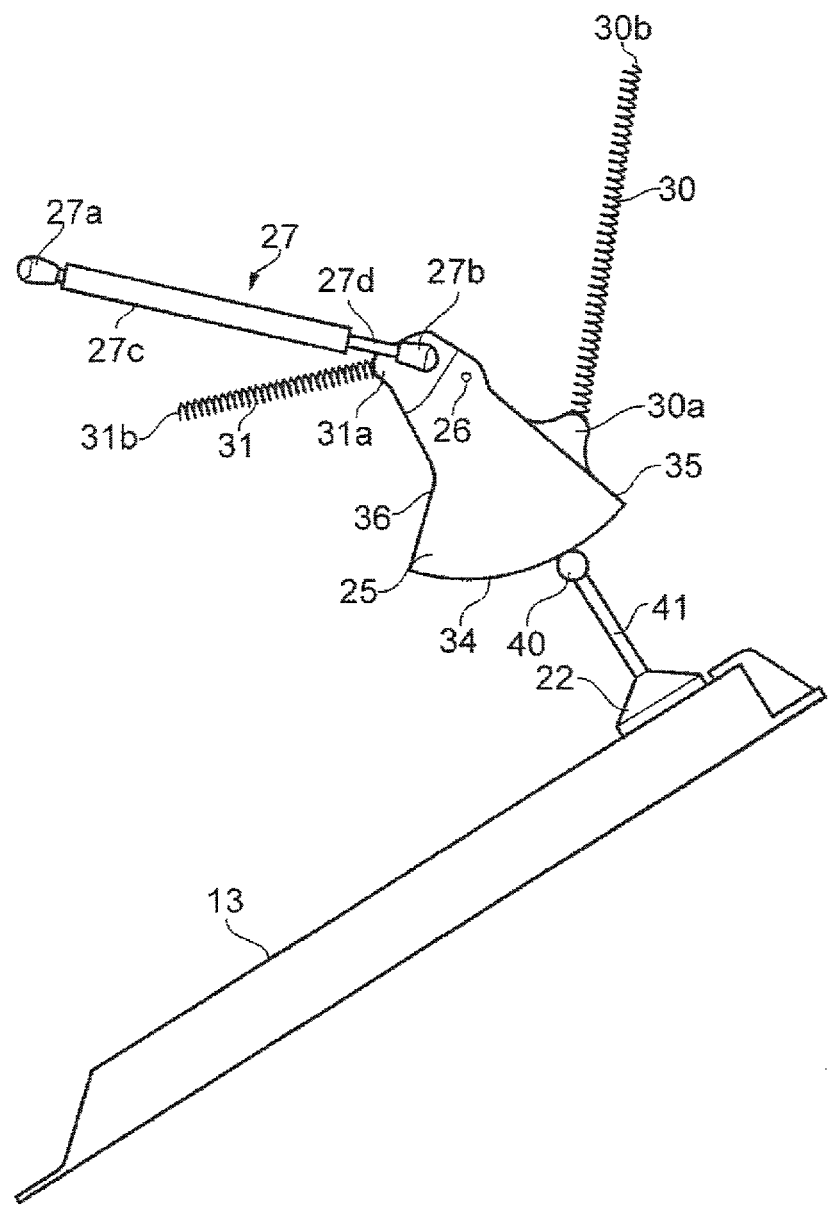

FIG. 2 shows the door in its closed position. In this closed position a spherical ball 40 at the distal end of the fitting is slightly spaced apart from the roller so that as the door is opened from its closed angle over an initial opening range of 0-2° the damper 27 is decoupled from the door and does not damp the door. When the door reaches an angle of 2° as shown in FIG. 7 the ball 40 engages the rib 39 so that the damper 27 starts damping the motion of the door. As the door continues to open over a damped opening range of 2°-32° the ball 40 pushes the rib 39 via a rolling interaction which causes the roller to rotate down relative to the airframe on its pivot bearing 26. As it does so, the piston moves first into the cylinder and then out of the cylinder, damping the motion of the door. When the door reaches an angle of 32° as shown in FIG. 8 the ball 40 clears the tip of the rib 39 and then disengages. As the ball 40 disengages from the rib 39 the extended upper spring 30 immediately pulls the roller back up to its central position. In this retracted central position no part of the roller 25 or damper 27 lies outside the landing gear bay, so aerodynamic drag is minimised. The door then continues to open over a non-damped opening range of 32°-145° during which time the retracted damper does not damp the motion of the door. FIG. 9 shows the door opened to an angle of about 75°.

Figure 10:
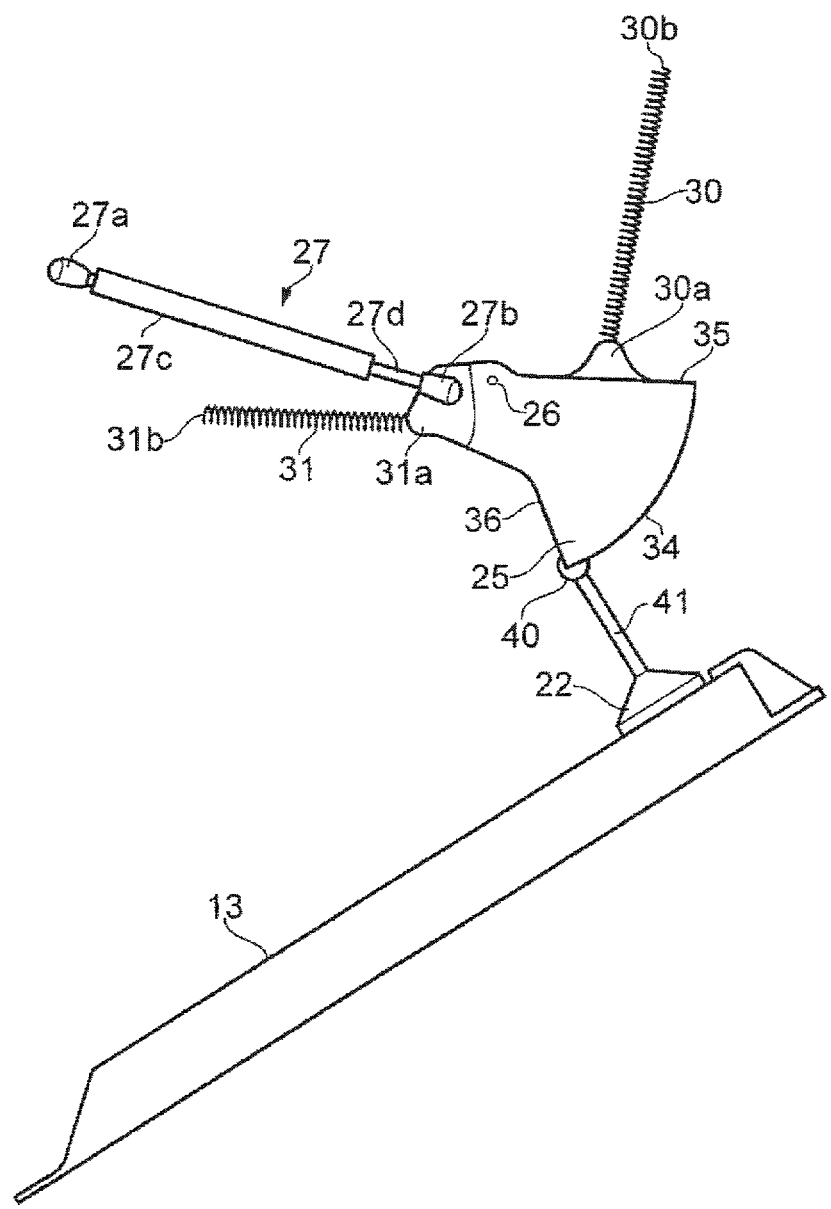
Figure 11:
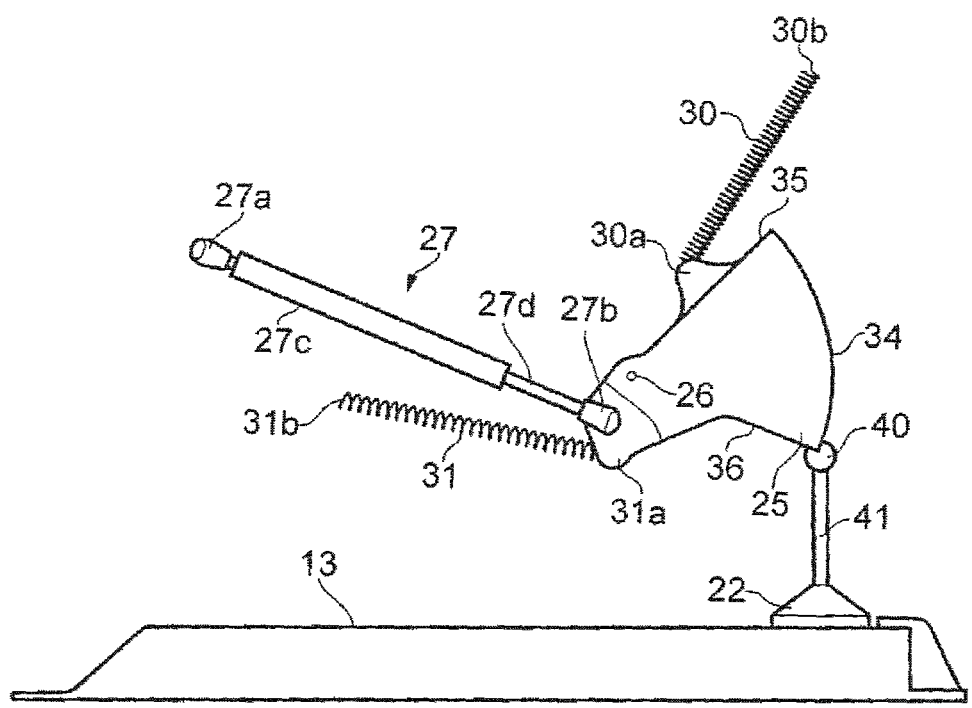

As the door is closed over a closing range of 145°-32°, the damper remains decoupled and does not damp the motion of the door. When the door reaches an angle of 32° the ball 40 engages the recess 36a in the lower edge 36 of the roller as shown in FIG. 10 so that the damper starts damping the motion of the door. As the door continues to close over a damped closing range of 32°-2° the fitting pushes the edge 36 via a rolling interaction which causes the roller to rotate up. As it does so, the piston of the damper moves out of the cylinder, damping the motion of the door. When the door reaches an angle of 2° as shown in FIG. 11 the ball 40 clears the tip of the edge 36 and then disengages. As the ball 40 disengages from the edge 36 of the roller the extended lower spring 31 immediately pulls the roller back down to its central position, resetting the damping mechanism for the next opening and closing cycle. The door then continues to close to its fully closed position over a final non-damped closing range of 2°-0° during which the damper does not damp the motion of the door.

The roller and the fitting act together as a coupling mechanism. The coupling mechanism couples the damper to the door only during about the inner 20% of the range of motion of the door. This arrangement is preferred in comparison to a linear damper which is directly attached to the door, since such a damper would need to have a very long stroke; would need to be very long (or attached to a very long door fitting) to avoid clashing with the structure of the airframe; and would be in the airflow outside the fuselage profile at all times that the door is open, leading to aerodynamic drag.

Although the invention has been described above with reference to one or more preferred embodiments, it will be appreciated that various changes or modifications may be made without departing from the scope of the invention as defined in the appended claims.

The invention claimed is:
1. A landing gear door damping mechanism comprising:
a damper; and
a coupling mechanism comprising:
    a roller which is pivotally attached to the damper and has a pivot bearing for pivotally connecting the roller to a landing gear door when in use; and
    a fitting which is engagable with the roller to couple the fitting with the damper and disengageable with the roller to decouple the fitting from the damper;
wherein the roller further comprises:
    a pair of parallel planar faces which taper outwardly from the pivot bearing to a convex curved edge, an upper edge and a lower edge,
    a first and a second recess formed in the convex curved edge,
    a rib between the first and the second recesses, and
    a third recess formed in the lower edge.

2. The landing gear door damping mechanism of claim 1 further comprising a return mechanism arranged to rotate the roller about the pivot after the fitting and roller are disengaged.

3. The landing gear door damping mechanism of claim 1 wherein the fitting comprises an elongated member with a curved tip which interacts with the roller via a rolling interaction.

* * * * *